Dec. 15, 1936.   S. EVANS   2,064,247
KICK-OFF COLLAR
Filed April 24, 1934
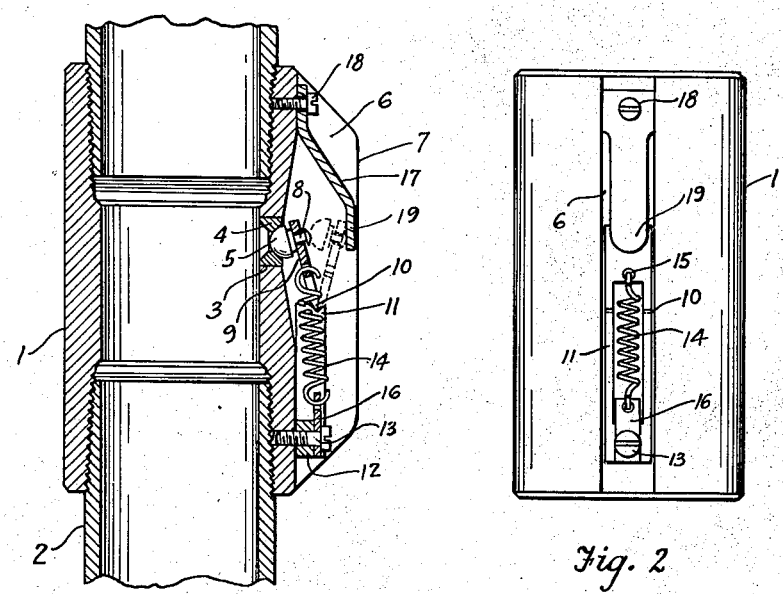
Fig. 1
Fig. 2
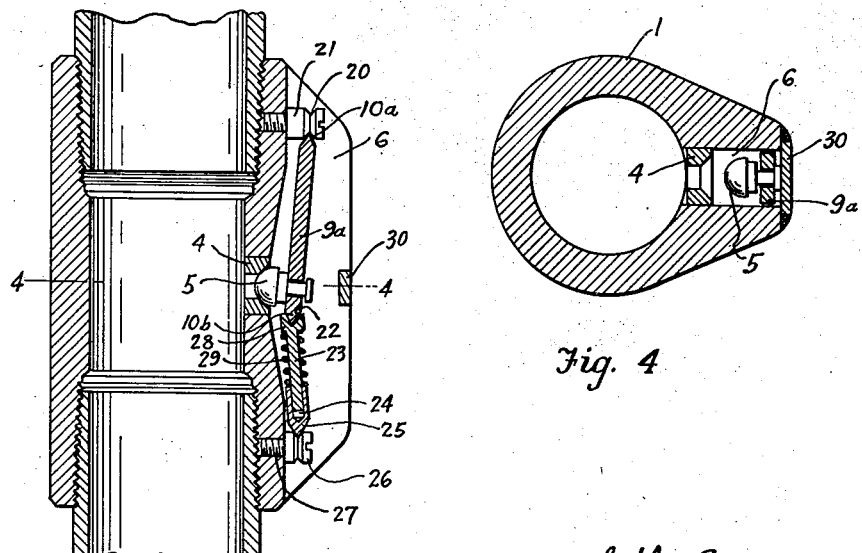
Fig. 3
Fig. 4
Seth Evans
INVENTOR.
BY Jesse R. Stone
ATTORNEYS.

Patented Dec. 15, 1936

2,064,247

UNITED STATES PATENT OFFICE 2,064,247

KICK-OFF COLLAR

Seth Evans, Houston, Tex., assignor to Hughes Tool Company, Houston, Tex., a corporation of Texas Application April 24, 1934, Serial No. 722,070

9 Claims. (Cl. 103—232)

My invention relates to automatically operating valves employed in controlling the passage of pressure fluid to or from a well tube in air or gas lift devices where said valves are used with or without a plunger in said tube. Such valves are commonly called kick-off valves for the reason that they allow the air or gas to enter below the load of liquid above the valve and force said load from the well.

It is an object of my invention to provide a kick-off valve which will be held resiliently in either open or closed position.

I desire to provide a valve that, when closed, will be held in that position by pressure in addition to that of the pressure fluid so that leakage about the valve may be prevented. Where a valve is held normally open and is closed only by a sufficient differential of pressure between the inside and outside of the eduction tube, the valve tends to be held very loosely in closed position particularly where the pressures are light or variable, and leakage past the valve may occur. This, I aim to avoid.

I also aim to provide a valve which, when closed, will not open again when the fluid pressures are equalized on both sides of the valve, but which will require a reversal of pressures to move the said valve from closed position.

In the drawing herewith Fig. 1 is a central vertical section through a kick-off valve embodying my invention.

Fig. 2 is a side elevation of the valve shown in Fig. 1.

Fig. 3 is a central vertical section similar to Fig. 1 but illustrating a slightly different embodiment of the invention.

Fig. 4 is a transverse section through the valve shown in Fig. 3 and taken on the plane 4—4 in that figure.

My valve is preferably incorporated in a tubular collar 1, threaded at its ends to be coupled in the eduction tube 2 for conducting the liquid from the well. On one or more sides of the collar 1 provide an inlet port 3 in which is fixed a seat ring 4 having a flared opening therethrough to receive the valve 5.

The valve seat is formed in a groove 6 provided in the thickened portion 7 of the wall of the collar. This groove serves also to house and protect the valve 5 and its control mechanism. Said valve is shown of hemispherical shape with a projecting stud 8 on its outer face, said stud extending through an opening in the end of the arm 9, and having its extremity upset to hold said valve loosely in position on said arm.

The arm 9 has its end remote from the valve beveled to an edge 10, and as will be seen from Fig. 2, the arm is a flat plate. The beveled end engages within transverse notches in a pair of arms 11, extending upwardly from a base 12 secured to the inner wall of groove 6 by a cap screw 13. Between the two arms 11 is mounted a tension spring 14, the upper end of which is engaged through an opening 15 in the arm 9. The lower end is anchored to a plate 16, held in place by said cap screw 13. This spring holds the arm 9 with its lower end fitting within the grooves 10 but allowing it to rock between the valve seat and an outer stop plate 17.

The stop plate comprises a narrow plate of metal having its upper end fixed to the collar within the groove 6 by a cap screw 18 or other similar means. The plate is bent outwardly and has a stop finger 19 at its lower end to limit the outward movement of the valve arm 9.

In use the spring 14 acts to hold the valve arm in either open or closed positions of the valve, with a certain resilient force which may be overcome to move the valve by a predetermined preponderance of fluid pressure on one side or the other of the valve. The pressure differential necessary to move the valve may be varied by the size or tension force of the spring 14. It is obvious that when the valve has been closed, it will be held in that position until a preponderance of pressure within the tube moves the valve to its open position shown in dotted lines in Fig. 1.

In the embodiment shown in Fig. 3 the structure is the same as is that in the Fig. 1 embodiment except for the mounting of the valve and its control mechanism. In this form the valve 5 is mounted upon the lower end of an arm 9ª. This arm is beveled at both ends to a knife edge 10ª and 10ᵇ so as to allow a rocking movement at either end. The upper end of the arm fits within an annular groove 20 in a screw head 21. The lower end of the arm engages in a groove 22 in a rock arm 23.

The lower end of the rock arm 23 fits slidably within a socket 24 in a rocking member 25, the lower beveled end of which fits within a groove in the head 26 of a cap screw 27. Between the socket 24 and a head 28 upon the arm 23 is a tension spring 29 which holds said head with a certain force into engagement with the edge 10ᵇ of the valve arm 9ª.

To limit the outward swing of the valve in this embodiment, I employ a cross bar or plate 10 extending across the groove 6 and secured in place by welding or other preferred means.

In both embodiments, a toggle mechanism is employed to hold the valve in either open or closed adjusted position, but allowing the movement of the valve at the desired time. The advantage of this means of controlling the valve is that, when once moved to either position the valve may be depended upon to stay positively in the proper position until the direction of flow through the valve orifice changes with sufficient force to move the valve. Thus when the valve is closed the operator may rely upon its staying closed and not leaking so long as there is not a marked reversal of pressure, whereby the fluid pressure inside the tube moves the valve to open position. If when the device has all the valves closed and it is desired to open them, this may be readily accomplished by the introduction of sufficient pressure fluid into the tube 2.

Thus also when the valve is employed with pneumatically operated plungers within the tube, the valves would tend to open at each rise of the plunger due to equalization of pressures at the valve, but where my valve is employed the valve will not open until there is an excess of pressure within the tube. I thus have a valve which may be depended upon to remain in open or closed position, but which may be controlled by the exertion of a predetermined excess of pressure upon either side of the valve.

What I claim as new is:

1. A tubing coupling having a lateral fluid port therein, a valve seat in said port, a valve adapted to fit said seat, and means controlling said valve and acting to hold said valve in either open or closed position with a predetermined force, said valve being adapted to be moved by a preponderance of fluid pressure on one side thereof.

2. A tubing coupling having a lateral fluid port therein, a valve seat in said port, a valve adapted to fit said seat, a swinging valve arm supporting said valve, a second arm having a rocking engagement with one of the ends of said valve-arm, and a spring acting to hold said two arms in engagement.

3. A tubing coupling having a lateral fluid port therein, a valve seat in said port, a valve adapted to fit said seat, a pair of arms having a rocking engagement with each other, one of said arms acting to support said valve, means to limit the movement of said valve away from said seat, and means giving a toggle action to said arms to hold said valve in either open or closed position.

4. A tubing having a lateral port therein, a valve seat on the outer end of said port, a valve arm outside said port, a support for one end of said arm allowing said arm to swing, a valve on the swinging end of said arm, and a spring acting to hold said arm in swinging engagement with said support, and to retain said valve resiliently in either open or closed position relative to said seat.

5. A tubing having a lateral port therein, a valve seat on the outer end of said port, a valve arm outside said port, a support for one end of said arm allowing said arm to swing, a valve on the swinging end of said arm, means to limit the movement of said valve away from said seat, and a spring acting to hold said arm in swinging engagement with said support, and to retain said valve resiliently in either open or closed position relative to said seat.

6. A flow device for wells including a well casing, a tube therein, a collar on said tube, a fluid passage to conduct pressure fluid in said casing through the wall of said collar, said passage having a valve seat therein, a valve tending to control said passage and positioned to be moved by pressure fluid to and from position closing said passage and means to hold said valve in either open or closed position with a predetermined force.

7. A flow device for wells including a well casing, a tube therein, a collar on said tube, a fluid passage to conduct pressure fluid in said casing through the wall of said collar, said passage having a valve seat therein, a valve tending to control said passage and positioned to be moved by pressure fluid to and from position closing said passage, and means acting to hold said valve resiliently in either open or closed position relative to said seat.

8. A flow device for wells including a casing, a flow tube therein, a collar on said tube, a fluid passage through the wall of said collar having a seat therein, a valve mounted to engage said seat and positioned to be moved by fluid pressure to and from closed position, means to limit the movement of said valve away from said seat so that the flow of fluid into said port with a predetermined rate of flow will seat said valve, and means holding said valve resiliently in either open or closed position.

9. A tubing for wells, a coupling thereon having a lateral fluid port therein to permit pressure fluid to flow from said well into said tubing, a valve positioned adjacent said port and adapted to be closed by the flow of pressure fluid through said port, and means to hold said valve resiliently in closed position, said valve being moved to open position by a preponderance of fluid pressure on the inside of said tube, said means then acting to retain the valve resiliently in open position.

SETH EVANS.